W. W. WHIDDIT.
Mechanical Negative Softeners.
No. 156,245.  Patented Oct. 27, 1874.
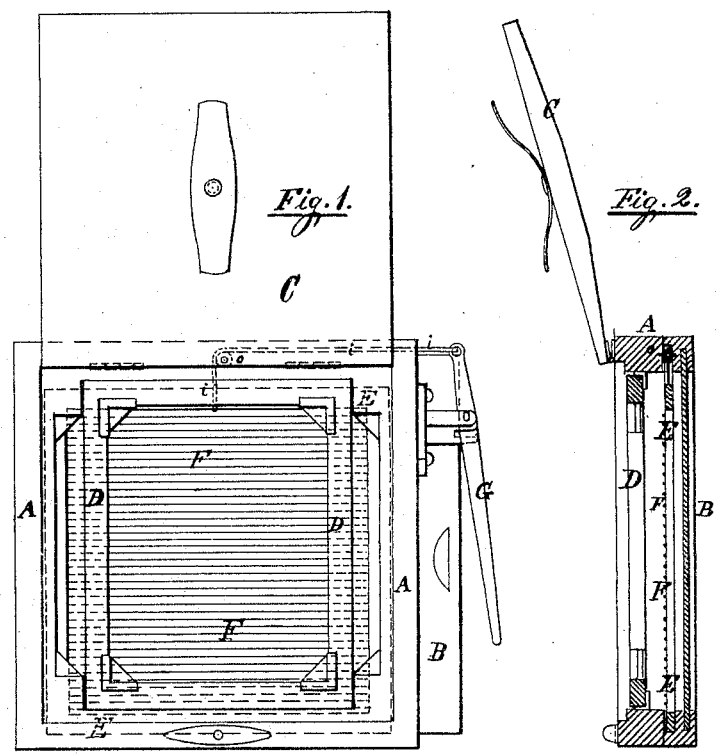
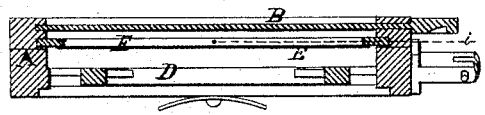
WITNESSES:  INVENTOR:

UNITED STATES PATENT OFFICE.

WILLIAM W. WHIDDIT, OF NEWBURG, NEW YORK.

IMPROVEMENT IN MECHANICAL NEGATIVE-SOFTENERS.

Specification forming part of Letters Patent No. 156,245, dated October 27, 1874; application filed March 14, 1874.

*To all whom it may concern:*

Be it known that I, WILLIAM W. WHIDDIT, of Newburg, in the county of Orange and State of New York, have invented a certain Mechanical Negative-Softener, of which the following is a specification:

The nature of my invention consists in placing between the lens and the photographic sensitive plate a movable screen of threads, or of wire, or of gauze, either in parallel lines or woven, or of any mesh-like material, and put the same in a reciprocating motion by hand, or by any mechanical means, during the time of taking the picture.

The screen may be stretched on a frame, or be fastened to a roller, or held otherwise, and may be placed in the plate-holder or in the camera. The light, reflecting from the exposed plate against the lines of the screen, are again thrown back against the plate, and so on, and by keeping the screen moving the impression on the plate is softened, giving the picture a soft and lifelike appearance, doing away, in a great measure, or altogether, with the retouching of the negative. Referring to the annexed drawing, in which—

Figure 1 represents a view of the plate-holder for an instrument, Fig. 2 is a vertical, and Fig. 3 a horizontal cross-section of the same.

A A is the plate-holder frame, as commonly used by artists for taking pictures. B is the sliding cover at the front part; C, the hinged cover at the back of the holder to protect the photographic sensitive plate before the holder is fastened to the camera. D is the frame to hold the sensitive plate, and between this frame D and the sliding cover B is placed the screen F F, fastened to a frame, E E, which is allowed in a suitable space to move up and down, or sidewise a short distance forward and back.

If the frame is intended to move vertically, the threads of the screen run horizontal, and the frame, with the screen, can be moved by simply attaching to the upper end a string, which, running over a small guide-roller, $o$, may be pulled by hand to move the frame up, while its own weight will let the frame move down again; or the thread may be pulled by a small lever, G, attached to the frame A, or by any other means.

If the frame E is intended to be moved horizontally, the threads of the screen are to run vertical, and the frame may be pulled one way on a string by hand, while a few small strips of elastic rubber pull the frame back. The point is to keep the screen moving during the time the photographic sensitive plate is exposed to the light through the lens. G represents a lever, by which the screen F may be moved by a string, $i\ i$, running over a roller, $o$, and fastened to the upper end of the frame E.

The operation would be similar if the screen was attached to the camera in the same way as it is shown to be attached to the plate-holder.

What I claim as my invention, and desire to secure by Letters Patent, is—

The movable screen F, composed of thread, wire, or gauze, either in parallel lines or interwoven, placed between the lens and the sensitive plate, and moved by hand or by mechanical means during the time the sensitive plate is exposed to the light through the lens, substantially as and for the purpose specified.

WILLIAM W. WHIDDIT.

Witnesses:
J. R. BUXTON,
J. H. GERECKE.